US007694221B2

(12) United States Patent
Fortes

(10) Patent No.: US 7,694,221 B2
(45) Date of Patent: Apr. 6, 2010

(54) CHOOSING BETWEEN MULTIPLE VERSIONS OF CONTENT TO OPTIMIZE DISPLAY

(75) Inventor: Filipe Fortes, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1074 days.

(21) Appl. No.: 11/364,236

(22) Filed: Feb. 28, 2006

(65) Prior Publication Data

US 2007/0203878 A1  Aug. 30, 2007

(51) Int. Cl.
*G06F 17/21* (2006.01)
*G06F 17/27* (2006.01)

(52) U.S. Cl. ........................ 715/249; 715/273

(58) Field of Classification Search ............... 715/523, 715/249
See application file for complete search history.

(56) References Cited

U.S. PATENT DOCUMENTS

| 5,521,658 | A | 5/1996 | Donohue | |
|---|---|---|---|---|
| 6,272,672 | B1 | 8/2001 | Conway | |
| 6,745,163 | B1 | 6/2004 | Brocious | |
| 7,020,690 | B1 | 3/2006 | Haitsuka | |
| 7,185,274 | B1 | 2/2007 | Rubin | |
| 7,337,392 | B2* | 2/2008 | Lue | 715/234 |
| 7,412,644 | B2 | 8/2008 | Keiffer | |
| 7,516,400 | B2 | 4/2009 | Ovetchkine | |
| 2002/0016801 | A1 | 2/2002 | Reiley | |
| 2005/0071757 | A1* | 3/2005 | Ehrich et al. | 715/513 |

OTHER PUBLICATIONS

Office Action dated Oct. 18, 2007 cited in U.S. Appl. No. 11/074,476.
Office Action dated Apr. 15, 2008 cited in U.S. Appl. No. 11/074,476.
Office Action dated Sep. 3, 2008 cited in U.S. Appl. No. 11/074,476.
Notice of Allowance dated Jan. 12, 2009 cited in U.S. Appl. No. 11/074,476.

* cited by examiner

*Primary Examiner*—Doug Hutton
*Assistant Examiner*—Tionna Smith
(74) *Attorney, Agent, or Firm*—Workman Nydegger

(57) ABSTRACT

Described is a technology by which a piece of content is selected from among at least two pieces of content in response to a request to return content. The selection is based on an evaluation of current state data against the properties/characteristics of the content. For example, the state data may define a currently available size; each piece of content has associated size properties (e.g., height and width ranges) that can be matched in the selection process. In a layout system, a parent container may request content from a child container that is associated with the selection process. The selection process may, for example, evaluate the child's pieces of content in an evaluation order, with the first appropriate matching piece of content selected. If no content matches, a default piece of content, or a code that indicates that no content is to be shown, is returned.

12 Claims, 5 Drawing Sheets

CHOOSING BETWEEN MULTIPLE VERSIONS OF CONTENT TO OPTIMIZE DISPLAY

BACKGROUND

Advances in hardware display technology have provided great diversity in display devices. For example, contemporary display screens vary from approximately two inches (such as for cell phones), to fifteen to twenty inches (such as for laptops and desktops), to several feet (such as with for media centers). There are also other differences in display types as well, e.g., aspect ratios may differ. Further, different users need diverse display characteristics, as users have different levels of visual acuity, for example, which requires different display characteristics such as font size.

These differences in device and end-user characteristics present a challenge for content developers, who need to create content that can dynamically adapt to changes in device or zoom factor. For example, a user may move the same piece of content from using a tablet PC on a crowded commuter train to a high-resolution media center at home. Very little if any content can dynamically adapt to be comfortably consumed by users across such a wide range of scenarios.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards returning a piece of content selected from among at least two pieces of content, in response to a request to return content. The selection is based on an evaluation of current state data against the properties/characteristics of the various pieces of content. For example, the state data may be provided as parameter data received with the request to return content, such as from a parent container in a layout system, in which the state data defines a currently available size. Each piece of content has associated size data (e.g., height and width ranges), and thus a closely matching piece of content based on a size evaluation may be selected and returned.

In one example implementation, a parent container has a child selection container. That child selection container is associated with a selection process that evaluates content property data against parameter state data provided by the parent container. The evaluation determines whether to return content for output in response to a request, and if so, which piece of content to return. For example, pieces of content can be reviewed in an evaluation order, with a first appropriately matching piece of content selected and returned. If no content matches, a default piece of content may be instead returned, or a code or the like may be returned indicating that no matching content is to be output.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
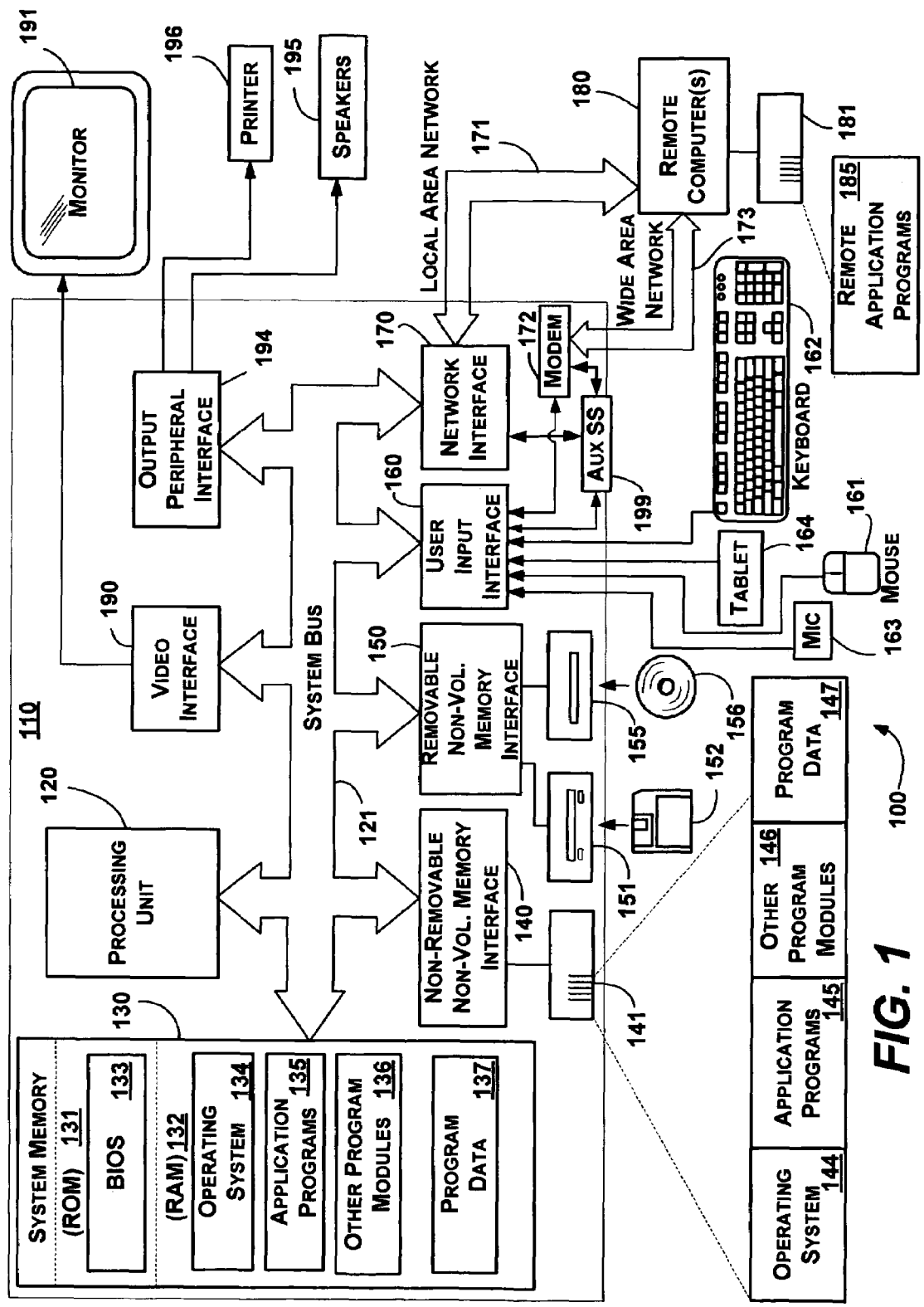
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It may be appreciated that the network connections shown are exemplary and other means of establishing a communications link between the computers may be used.

An auxiliary display subsystem 199 may be connected via the user interface 160 to allow data such as program content, system status and event notifications to be provided to the user, even if the main portions of the computer system are in a low power state. The auxiliary display subsystem 199 may be connected to the modem 172 and/or network interface 170 to allow communication between these systems while the main processing unit 120 is in a low power state.

Choosing Between Multiple Versions of Content

Various aspects of the technology described herein are directed towards a technology by which a content developer or the like may provide multiple versions of content, from which one version may be selected for display based upon current conditions as preset by the developer. For example, the conditions may be the amount of size that is currently available for rendering, such as based on the current zoom level and/or screen size (or windowing size). Further, the technology allows a developer to specify whether specific pieces of content will be shown or hidden as the available size changes, e.g., as the zoom level, current window size and/or screen size changes.

As will be also understood, numerous ways to implement the present invention are feasible, and only some of the alternatives are described herein. For example, in one example implementation described herein, the developer provides elements, referred to as containers, that operate in a unified core layout system that provides functionality that is consistent across elements, and that is normalized to keep complex interactions as minimal as possible. One such layout system is described in U.S. patent application Ser. No. 11/074,476, filed Mar. 7, 2005, assigned to the assignee of the present invention and hereby incorporated by reference. In this system, developers essentially provide content in parent and/or child containers that interoperate with the layout system to leverage layout functionality in the platform, while receiving results consistent with the rest of the system.

In this layout system, an example framework, (e.g., provided by the Windows® Presentation Foundation), when coupled to a core component, provides a protocol and policy for layout via a number of properties; notwithstanding, a different framework may be coupled, with a different protocol and policy to achieve different results. Moreover, a core and framework model is not necessary to the present invention, as the functionality may be combined into single component, or may be divided up into more components. Still further, the present technology also applies to printers, projectors and other visible output. As such, the present invention is not limited to any particular examples used herein, but rather may be used various ways that provide benefits and advantages in computing in general.

Figure 2:
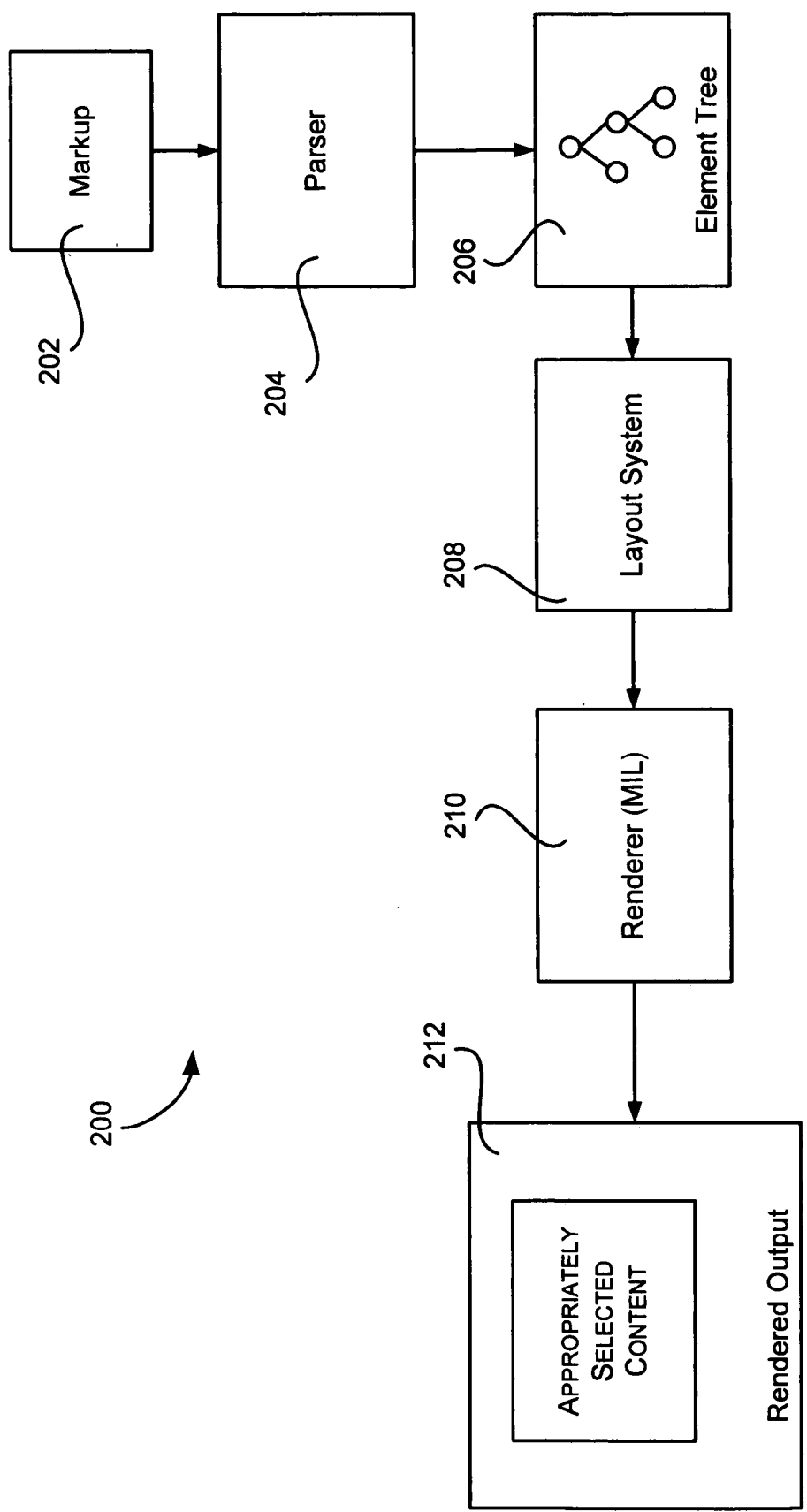
FIG. 2 is a representation of an architecture including a layout system in which appropriate content may be selected for display.

Turning to FIG. 2, there is shown an example architecture 200 for rendering user interface elements. In this example, a developer may provide code and content (e.g., via markup 202 of a suitable markup language) to cause user interface elements to be rendered as specified by the developer. For example, via markup, a developer may specify that a button should appear on the screen with certain parameters such as color or monochrome, border, text and/or other appearance information. As described below, one piece of content that a developer may provide for rendering may be one that is selected from among a plurality of available pieces of content in a selection container, such as content appropriately selected based upon the current rendering conditions (e.g., the available size for that content).

From this markup 202, a parser 204 constructs an element tree 206 of elements. The tree may have a number of parent and child elements, and a parent may be a container for one or more child elements, e.g., a parent menu bar may have child icons positioned therein. A child may be a parent of another child.

Figure 3:
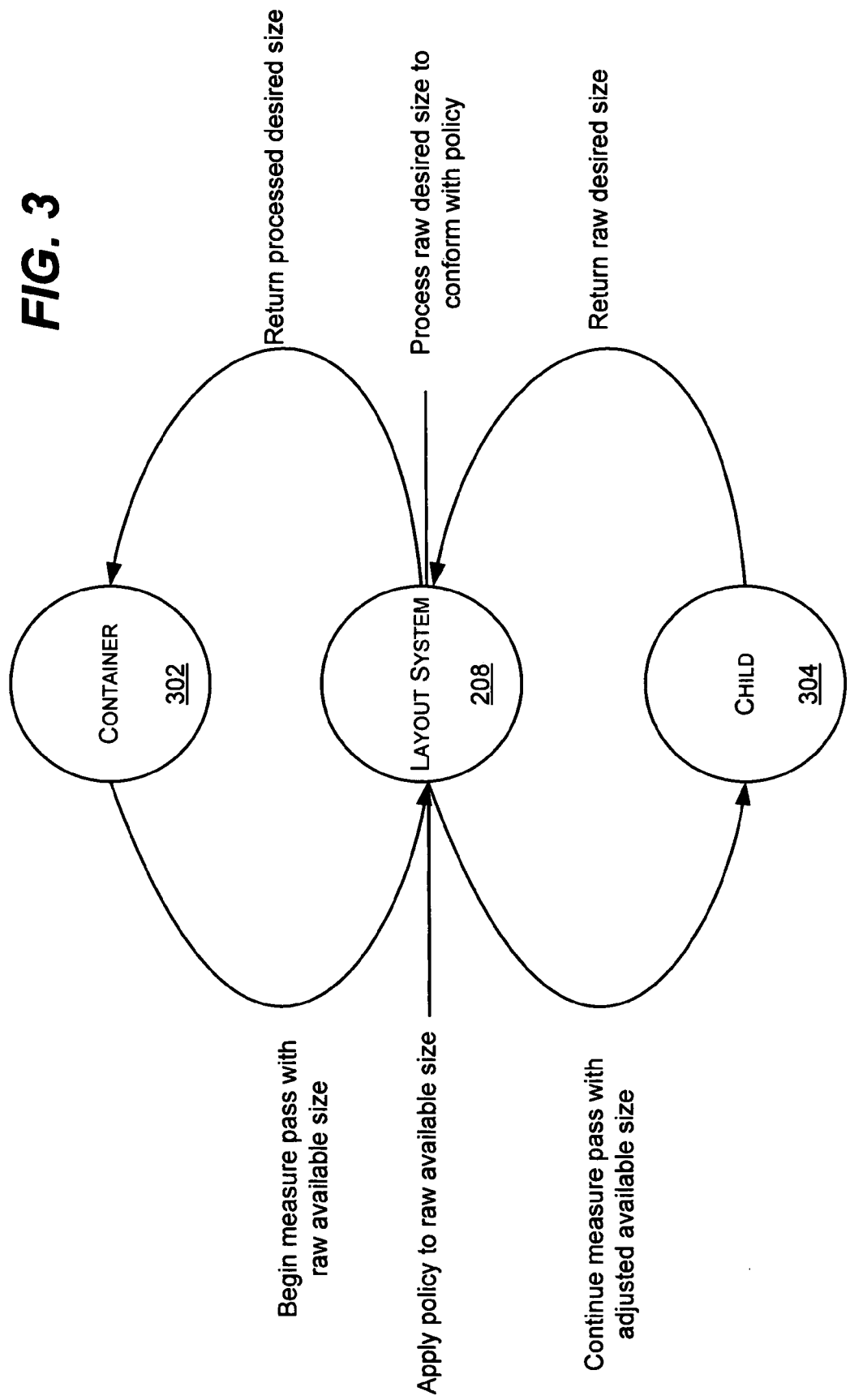
FIG. 3 is a representation of an example layout system in which appropriate content may be selected from a child container for display via a parent container.

A layout system (or subsystem) 208 is provided which removes much of the complexity of managing user interface element behavior. For example, one such layout system 208 comprises an API set which essentially intercepts calls (FIG. 3) in the element tree directed from parent elements (e.g., containers 302) to child elements 304, and as will be understood, handles a number of sizing and positioning issues in a uniform way. For example, if a child requests more space than is available in a parent's UI element, the layout will resize and position the child content in a uniform way without the parent or child having to deal with resizing and repositioning rules. Children and parents do not have to deal with margin adjustments, layout alignment, clipping, transformations and so forth, which are handled by layout, which determines sizes and positions of user interface elements. As generally represented in FIG. 3 and described in the aforementioned U.S. patent application Ser. No. 11/074,476, in one implementation, sizes are produced from "measuring" and positioning is done through "arranging," which each occur in distinct phases.

Once layout decisions are made in the layout system 208 and the elements in the element tree 206 are properly configured, a renderer component 210 (of a media integration layer, or MIL) takes data from the element tree 206, including the sizes and positions, drawing primitives and other information, and renders the user interface elements to a suitable display. For example, in FIG. 2, the rendered output 212 includes some piece of content comprising a rendered representation of one or more elements in the tree.

Figure 4:
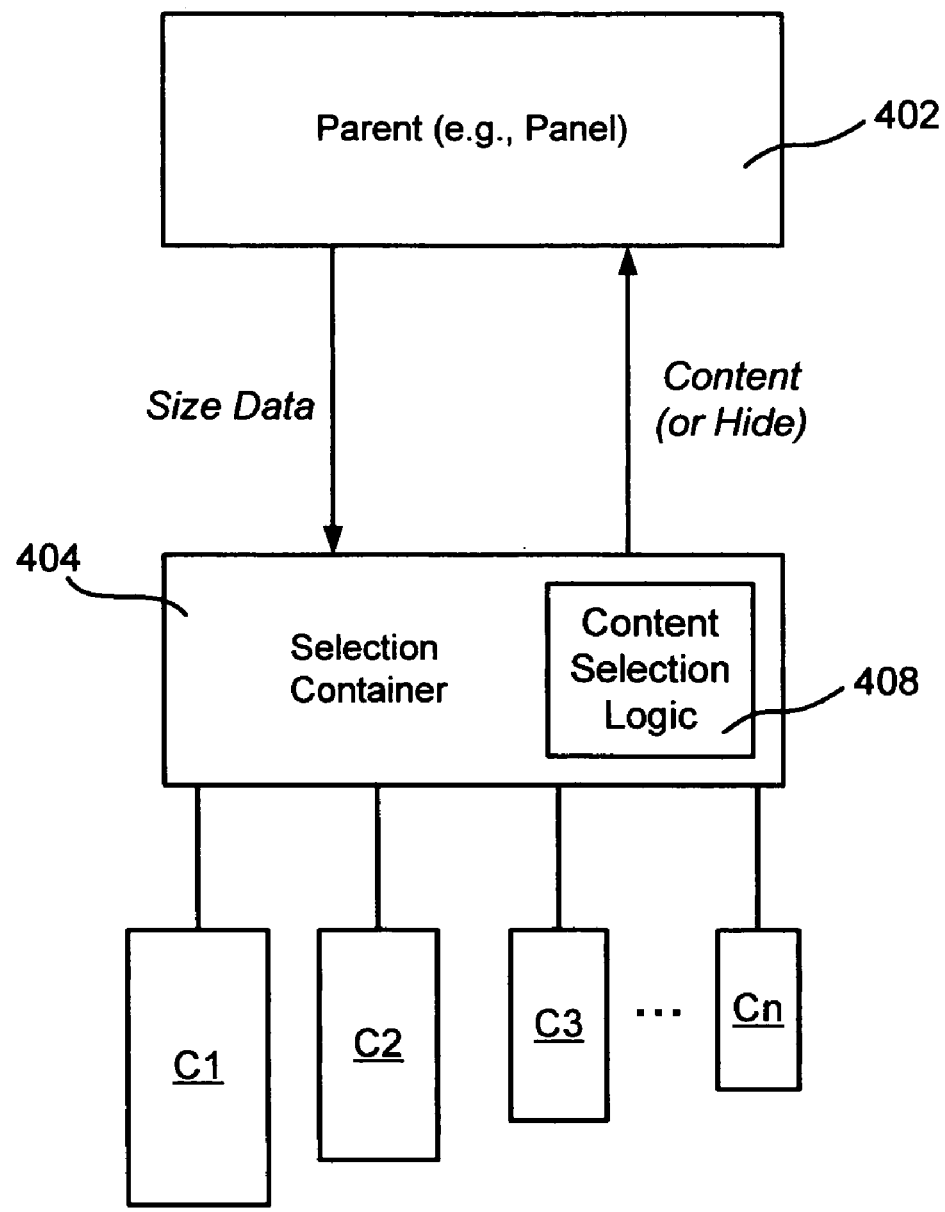
FIG. 4 is an example block diagram representing example parent and child containers including a selection container that selectively returns content in response to requests.

FIG. 4 shows an example parent element 402, such as a panel, which is a class provided in the example layout system. In general, the parent 402 contains one or more children, including a selection container 404, which may be a subclass of the panel class. In turn, the selection container has children C1-Cn, each corresponding to some content to render. While at least four children C1-Cn are shown in FIG. 4, it is understood that as little as two children, or up to any practical number of children, may hold content for the selection container 404; note that it is feasible to have a single child in a selection container, possibly to either select between the showing content or the hiding of content, as described below. Moreover, the blocks representing content C1-Cn are shown as having different (shrinking) dimensions to emphasize one likely scenario, however actual content pieces need not have different sizes, and the dimensions shown in FIG. 4 were chosen for simple understanding herein, rather than having any actual meaning.

Unlike a conventional container which returns all of its children (corresponding to content) to a requesting parent, and then lets its parent, in conjunction with the layout system, decide how to lay out its children, the selection container 404 described herein returns one piece of content selected from among its children C1-Cn to the parent 402. As described herein, this selection may be based on virtually any criterion or criteria made known to the selection container 404, such as by passing in parameter data. The selection container 404 includes logic 408 that selects the content based on the input data evaluated against properties of the children (content).

To this end, in one example implementation the content includes properties specified by the developer. For example, the developer may specify ranges of sizes (e.g., heights and widths) for which each piece of content design is appropriate. Within each and size range, the author may further specify things like how interpolation between sizes should work, how additional collapsing and addition of content may work within the design, and so forth.

In this way, a developer may create multiple renditions of content, and get appropriately selected content returned for display, which may vary based on criteria such as different sizes and aspect ratios. For example, in a typical situation, content corresponding to larger available display sizes will contain more detail and/or content.

In general, in this example implementation, available size data, corresponding to screen (or window) size and/or zoom level, are provided to the container by the parent (e.g., panel) container 402. Note that the parent container 402 or some other aspect of the layout system performs the calculations as to what size is available based on the screen/window size and/or zoom level. With this available size data, the parent container 402 makes a request for content from the selection container 404.

At the selection container 404, with the received request for content, parameter data corresponding to available space is passed in, such as in width and height parameter values (e.g., in pixels). As described above, each piece of content associated with the container has properties that specify its maximum and minimum heights and widths, that is, as ranges. For example, a piece of content may be specified by the developer as corresponding to data having a maximum width of 400 pixels and minimum width of 100 pixels, and a maximum height of 300 pixels and minimum height of 200 pixels. When the received available space parameter data matches this criteria, then this piece of content matches, and may be returned in response to the request for content. If it does not match, another piece of content may instead be returned. Example logic 408 for making the selection is described below with reference to FIG. 5.

More particularly, because multiple pieces of content may serve as acceptable matches, some type of scheme for selecting between acceptable pieces of content is required. One such scheme is based on an ordering of the content pieces C1-Cn, in which the order is determined by the content developer. In this scheme, the pieces of content are examined in order, such as by having its maximum and minimum properties checked against the available space data, until the first acceptable match is found, that is, the available size data fits within the content's range. When a match is found, the matching piece of content is returned (directly or via any indirect mechanism such as an identifier or pointer thereto) to the parent container 402. The selection process logic 408 thus ends on the first acceptable match, such as C2, with the later-ordered pieces of content (C3-Cn) not being evaluated.

Figure 5:
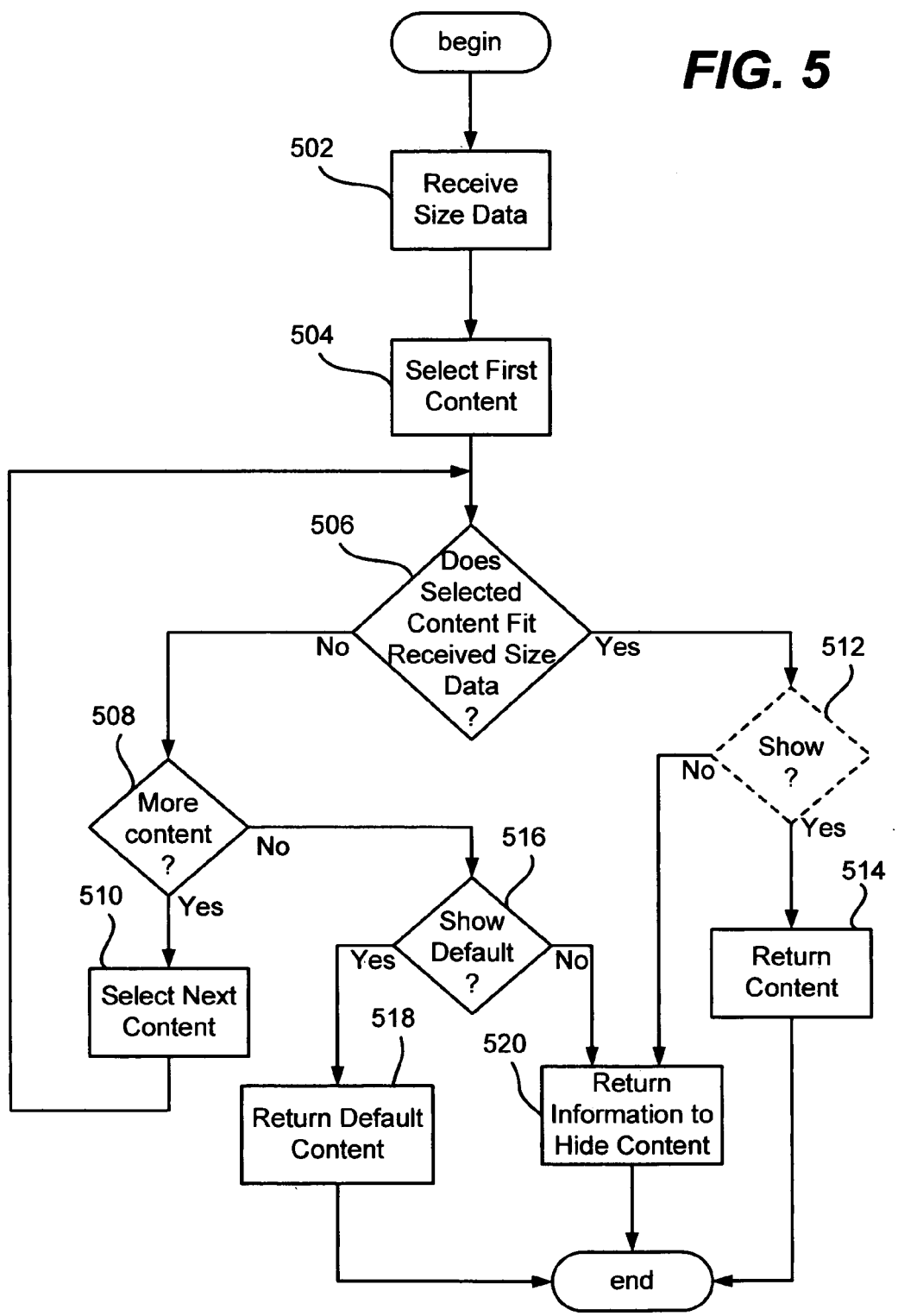
FIG. 5 is a flow diagram generally representing example steps taken by selection process logic to select appropriate content for returning in response to a request for content.

FIG. 5 shows one example of such selection process logic 408, beginning at step 502 where the data parameters (e.g., the available height and width values, already configured by at least one higher element) are received at the selection container 404. In the example of FIG. 5, using the received available size data against the properties for each piece of content, the container then locates its best matching content, using the selection process logic 408.

In the example of FIG. 5, the logic 408 is based on a straightforward content-ordering example, that is, testing for a match first against what the developer has deemed as the most desirable content to render if possible, and then if not matched, towards content deemed less-desirable. Step 504 thus selects the first content in the developer-specified order, and at step 506 evaluates the content's height and width properties against the received available size data.

If there is not a match, that is, in this example the content's size exceeds the available height and/or width, step 506 branches to step 508 where the selection process loops back, via steps 508 and 510, until a match is found at step 506 or no more content remains (as evaluated at step 508).

If there is a match at step 506, that is, in this example the available height and width criteria fit within the content's size ranges, step 506 branches to step 512. Step 512 represents the optional (as indicated by the dashed decision diamond) checking of an optional show/hide property value that may be associated with that piece of content, (that is, with the individual piece of content, not with the container). If the optional property is present and indicates that the content should be shown, (or if the optional property is not present), the content is returned to the parent container via step 514, e.g., directly or indirectly as a pointer/content identifier. Note that step 512 is not necessary if the container, rather than each piece of content, is associated with the show/hide default property, as described below.

If the property is present at step 512 but indicates the content is not to be shown, step 512 branches to step 520 where an errorcode or the like is returned to the parent container 402, (or the request times out), e.g., to indicate that no content is to be shown for this container. In this way, a developer can choose not to show content unless there is a sufficient criteria match. For example, a developer can mark the last piece of content in the ordering as "hide," and then may specify size properties for the last piece of content in the ordering such that there will always be a match at step 506 for this last piece of content, (e.g., any received height and width data above zero will satisfy the test at step 506). However, if this last piece of content is reached because no earlier-ordered piece of content matched, no content will be shown. In this way, a size that is too small to match anything the developer wants to show will result in nothing being shown, (typically until the available size grows at some later time). In such an event, the errorcode or the like is returned at step 520 so that no content will be shown in the available area.

Further, it may be possible that the developer has not specified any piece of content that matches. In this situation, a developer may specify that a default piece of content be shown (step 516) and returned (step 518), or specify that no piece of content be returned, via the show/hide property being set to hide, as evaluated at step 516. The default piece of content may be determined via a property setting, via its order (e.g., the first or the last) or via some other set of rules, such as closest fit. Note that the show/hide property may be set on the selection container 404 for all content, or may be set for each piece of content. In this manner, if desired, some default content may be placed in the available area, possibly with any needed scroll bars provided (by other aspects of the layout system) to allow the user to view the default content. Alternatively, the developer may choose that nothing is shown by default, by setting the show/hide property to hide for the default value.

It should be noted that many variations of the example selection logic are feasible, and that alternative logic may be employed. For example, the default content may correspond to the first piece of content (C1) of the selection container 404, with the show/hide property set to hide, and with step 512 removed from the process. Then, if no match is found, this first piece of content C1 is chosen an extra time as the default, with the show/hide property (on the container for all content or only for this piece of content) or on evaluated at step 516. By removing step 512, the first piece of content will be shown if it initially matches, but not when selected by default and the show/hide property is set to hide.

Further, rather than test for matches in an order, a scoring system or the like may be implemented in which each piece of content receives a score based on how well it corresponds to the received parameters. The highest scoring content would then be returned, with some tie-breaking process such as based on an ordering (or even random selection) employed when necessary. The content developer is generally in charge of what content is selected, although it is feasible to have a model in which the layout system or other entity makes some or all of the selection decision, e.g., to follow user preferences/overrides, or to show more than one piece of content at a time for some reason.

Moreover, size is not the only possible evaluation criteria; essentially any state that may vary with respect to rendered content may be used to select among different content types. For example, in addition to display size, other examples of display differences that may be used to select between content include a current aspect ratio (which may be passed or based on from the available screen size), screen resolution, color versus monochrome, type of color (e.g., 256 color or 32-bit RGB), and so forth. Other states not specifically related to the display's characteristics but may still be used as a criterion include an online versus offline networking (and/or signal quality) state, an interactivity state, proximity-state sensed, a device's current location, a device's current usage (e.g., while on a cellular telephone call) and so forth. In essence, any state data that can be quantified provided to or otherwise obtained by a selection container and evaluated against property constraints can be used as selection criterion for deciding which piece of content to return.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium having stored computer-executable instructions, which when executed perform a method, comprising:
   receiving a request to return content to a display of a computing system;
   identifying current conditions corresponding to the computing system;
   accessing an element tree that includes a plurality of different pieces of the content that have been provided by a developer and that each correspond to different display properties;
   identifying an evaluation order of the different pieces of content, wherein the evaluation order corresponds to a developer specified order for evaluating the different pieces of content based on current conditions and for selecting one of the different pieces of content to be displayed;
   evaluating the different pieces of the content in the evaluation order while searching for a match between the current conditions and a matching piece of the content;
   upon finding the matching version of the content, selecting the matching piece of the content to be returned to the display or, alternatively, upon determining that there is no match, returning a default piece of the content to the display; and
   returning, directly or indirectly, the selected piece of content or, alternatively, the default piece of the content to the display and in response to the request.

2. The computer-readable medium of claim 1 wherein the request is received from a parent container in a layout environment.

3. The computer-readable medium of claim 1 wherein the request includes state data corresponding to the requested content.

4. The computer-readable medium of claim 3 wherein the different display properties include a maximum and minimum height and a maximum and minimum width corresponding to each of the different pieces of the content, and wherein said evaluating the different pieces of the content includes searching for a matching piece of the content based on a maximum height or width corresponding to the available size information identified with the state data.

5. The computer-readable medium of claim 4 wherein the state data corresponds to size property data specified as at least one size range.

6. The computer-readable medium of claim 1 wherein said evaluating includes evaluating at least two different pieces of the content based on current state data before selecting the matching piece of content.

7. The computer-readable medium of claim 1 wherein the method further comprises determining that there is no match and returning the default data to the display.

8. In a computing environment, a method implemented by a computing system having a processor and one or more storage media storing instructions for implementing the method, the method comprising:
   receiving a request to return content to a display of a computing system;
   identifying current conditions corresponding to the computing system;
   accessing an element tree that includes a plurality of different pieces of the content that have been provided by a developer and that each correspond to different display properties;
   identifying an evaluation order of the different pieces of content, wherein the evaluation order corresponds to a developer specified order for evaluating the different pieces of content based on current conditions and for selecting one of the different pieces of content to be displayed;
   evaluating the different pieces of the content in the evaluation order while searching for a match between the current conditions and a matching piece of the content;
   upon finding the matching version of the content, selecting the matching piece of the content to be returned to the display or, alternatively, upon determining that there is no match, returning a default piece of the content to the display; and
   returning, directly or indirectly, the selected piece of content or, alternatively, the default piece of the content to the display and in response to the request.

9. In a computing environment, a system comprising:
   a processor; and
   one or more storage medium storing instructions which, when executed, implement the method of claim 8.

10. The method of claim 8, wherein the current conditions comprise at least one member of a set, the set containing, height data, width data, aspect ratio data, color-related data, screen resolution data, online versus offline state data, signal quality data, an interactivity state, proximity data, location data, and current usage data.

11. The method recited in claim 8, wherein the default piece of the content indicates that the content corresponding to the request is to not be displayed at the device.

12. The method of claim 8, wherein the current conditions comprise a zoom level associated with the display.

* * * * *